United States Patent [19]

Weiss

[11] 3,808,355

[45] Apr. 30, 1974

[54] SECRET SIGNALING SYSTEM

[75] Inventor: Arnold S. Weiss, Malibu, Calif.

[73] Assignee: Cutler-Hammer, Inc., Milwaukee, Wis.

[22] Filed: June 27, 1972

[21] Appl. No.: 266,650

[52] U.S. Cl. .................. 179/1.5 R, 178/6, 332/3, 325/32

[51] Int. Cl. .................. H04k 1/00

[58] Field of Search .................. 178/6, 22; 179/1.5 R; 332/3; 325/32

[56] References Cited

UNITED STATES PATENTS

| | | | |
|---|---|---|---|
| 2,401,402 | 6/1946 | Bedford | 179/1.5 R |
| 3,052,843 | 9/1962 | Hurvitz | 332/3 |
| 3,341,659 | 9/1967 | Stern | 179/1.5 M |
| 3,614,316 | 10/1971 | Andrews, Jr. | 178/22 |
| 3,711,645 | 1/1973 | Ehrat | 178/22 |
| 2,141,789 | 12/1938 | Iams | 332/3 |
| 2,050,737 | 8/1936 | Schriever | 332/3 |

*Primary Examiner*—Maynard R. Wilbur
*Assistant Examiner*—H. A. Birmiel
*Attorney, Agent, or Firm*—Christie, Parker & Hale

[57] ABSTRACT

Photographic opposites of a given image, i.e., a photo positive and a photo negative of the given image, are employed as encoding and decoding elements at a transmitter and a receiver, respectively. An information signal is modulated at the transmitter in accordance with the image density of one of the photos along a predetermined path. The modulated information signal is transmitted to the receiver where it is demodulated in accordance with the image density of the other photo along the predetermined path. More complex modulating factors for encoding the information signal are obtained by a plurality of serially arranged photo transparencies, each operating at a different frequency or phase or by employing a given image that is representative of the sum of a plurality of sources of the same type of information as the signal to be secretly transmitted. Selective transmission to one of a number of receivers is achieved by employing decoding discs that rotate at the same frequency but different phase. The encoding disc at the transmitter is adjusted to the phase of the decoding discs at a particular receiver.

14 Claims, 5 Drawing Figures

SECRET SIGNALING SYSTEM

BACKGROUND OF THE INVENTION

This invention relates to communication systems and, more particularly, to a secret signaling system based on a difficult to decipher, easily changeable code.

A large variety of secret signaling systems are in existence. The complexity and sophistication of such systems varies greatly. In general, the secret signaling systems based upon difficult to decipher codes are too complex and costly for many applications. For example, the so-called scrambler systems currently used for police communications can sometimes be deciphered by criminal elements through persistent trial and error. In general, the problem with such scrambler systems in that they are based on a code that is one of a discrete, albeit large, number of combinations of conditions. The code is deciphered by systematically running through these combinations until the communication becomes intelligible.

A. V. Bedford U.S. Pat. No. 2,401,402 and A. V. Bedford et al. U.S. Pat. 2,401,406, which issued June 4, 1946, disclose secret signaling systems based upon a code that is represented by the radius of a coding disc having an irregular outer edge. An infinite number of coding combinations is possible. A light source is disposed on one side of the coding disc near the edge, and a light detector is disposed on the other side of the coding disc in alignment with the light source. The intensity of the light reaching the detector varies as a function of the radius of the disc during disc rotation. Thus, the output of the light detector serves as a coding signal that is used to modulate an information signal. The product of the coding signal and the information signal is transmitted to a receiver where it is demodulated in one of two ways. First, there is employed a decoding disc having an outer edge that is designed to vary in accordance with the reciprocal of the coding disc. The disc design involves a substantial amount of calculation fabricating effort. Second, there is employed a decoding disc that is identical to the encoding disc and an electrical circuit for converting the signal produced by the disc to its reciprocal. The reciprocal circuit introduces a substantial amount of additional electronic complexity into the system.

Labin U.S. Pat. No. 3,419,568, which issued Apr. 29, 1947, discloses a secret signaling system, in which a key picture that is apparently a photograph serves both to encode and decode an information signal. At the transmitter the key picture is used to produce a masking, i.e., coding signal, that is added to the information signal, and at the receiver the key picture is used to produce the same masking signal that is subtracted from the transmitted signal to provide the information signal. Since the coding signal is added to rather than multiplied by the information signal, the reciprocal of the coding signal is not required for decoding purposes. However, addition does not render the transmitted signal as unintelligible as multiplication; the information can therefore be deciphered easier by unauthorized parties.

SUMMARY OF THE INVENTION

According to one aspect of the invention, photographic opposites of a given image, i.e., a photo positive and a photo negative of the given image, serve as encoding and decoding elements in a secret signaling system. An information signal to be transmitted in secrecy is modulated in accordance with the image density of one of the photos along a predetermined path at a transmitter to produce an unintelligible signal. After transmission to a receiver, the unintelligible signal is demodulated in accordance with the image density of the other photo along the predetermined path to produce the information signal. A photo positive and a photo negative, which can easily be produced one from the other, inherently possess a reciprocal relationship to each other. The coding combinations are infinite in number because the code depends upon the image on the photos and the predetermined path taken along the photos. To establish a new code, a photo positive and a photo negative of a different image is simply used, or a new path along the same photos is simply taken.

According to another aspect of the invention, the signal-to-noise ratio of the system is improved relative to an additive system by transmitting only the product of the information signal and the coding image density. All components of modulation other than the product are eliminated in a summing circuit.

According to another aspect of the invention, the given image represents the sum of a plurality of sources of the same type of information as the information to be secretly transmitted. This technique results in a modulated signal that is unintelligible to a very high degree. An alternative technique for increasing the degree of unintelligibility is to use a plurality of serially arranged photos to encode and to decode.

According to another aspect of the invention, code discs are provided at a command terminal and a plurality of satellite terminals. All the code discs rotate at the same frequency, the code discs of the various satellite terminals are out of phase with respect to each other, and the code disc at the command terminal is adjustable to be brought into phase with the code disc at any of the satellite terminals. As a result, the command terminal can selectively communicate with any one of the satellite terminals without interception by the other satellite terminals.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 1:
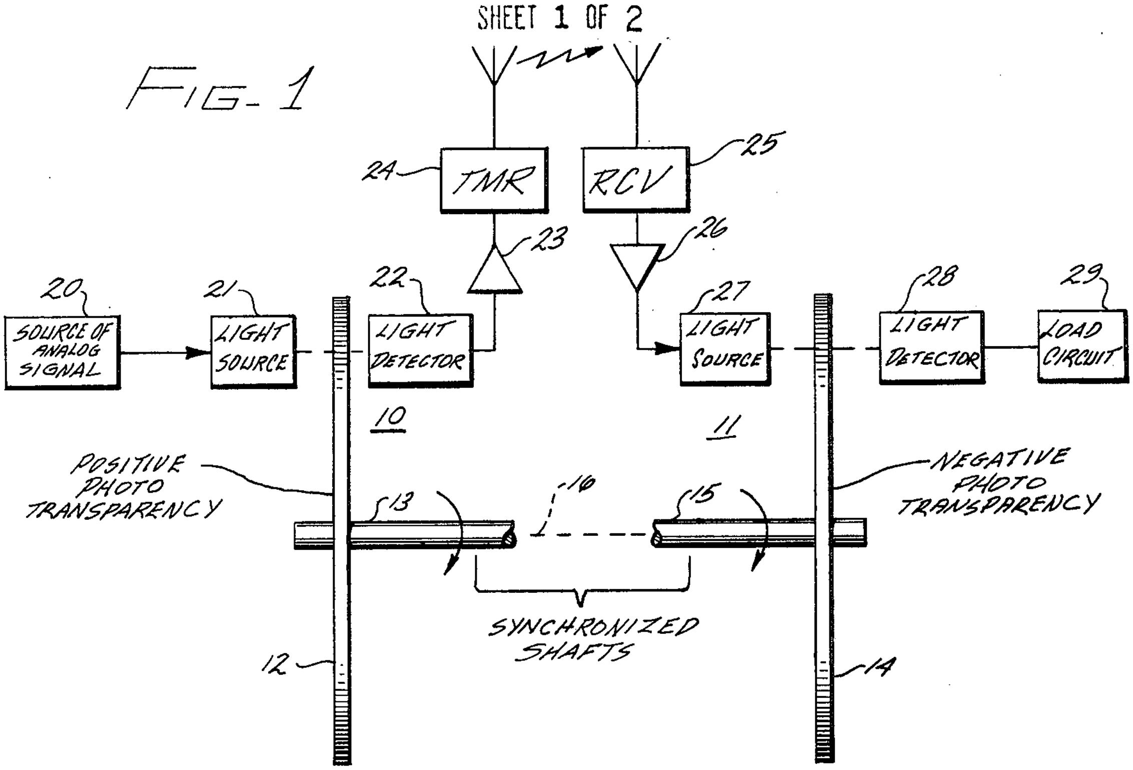
FIG. 1 is a schematic diagram of a secret signaling system incorporating the principles of the invention.

In FIG. 1, there is shown a transmitter terminal 10 and a receiver terminal 11 that is remotely located from terminal 10. A circular disc-shaped positive photo transparency 12, which is mounted for rotation on a shaft 13, is disposed at transmitter terminal 10, and a circular disc-shaped negative photo transparency 14, which is mounted for rotation on a shaft 15, is disposed at receiver terminal 11. As represented by a broken line 16, shafts 13 and 15 are synchronized by well known means not shown, so they rotate at precisely the same frequency, i.e., the same angular velocity, and in phase. Reference is made to Bedford U.S. Pat. 2,401,402 and Bedford et al. U.S. Pat. 2,401,406 for one possible technique to synchronize shafts 13 and 15. An alternative technique would be to use a synchro system. Transparency 12 is a positive representation of a given image, and transparency 14 is the negative representation of the same given image. Thus, transparencies 12 and 14 are photographic opposites, that can be easily produced one from the other by photographic techniques. Broadly, any image could be used, although as discussed below in connection with FIG. 4, images constructed in a particular manner are especially effective. Inherent in the photographically opposite relationship between transparencies 12 and 14 is the fact that the product of the light transmission at each point on transparency 12, and the corresponding point on transparency 14 is a constant. In other words, the sum of the image density of each point on transparency 14 and the density of the corresponding point on transparency 12 is a constant.

A source 20 of an analog electrical signal such as human voice microphone or other information source, is coupled to a light source 21 with a controllable intensity. Thus, the intensity of the light from source 21 is modulated in accordance with the amplitude of the signal from source 20. Light source 21 is disposed on one side of transparency 12 and a light detector 22 is disposed on the other side of transparency 12 in alignment with source 21. A transparency 12 rotates, the light transmission of the portion of the image between source 21 and detector 22 varies. Thus, the intensity of the light reaching detector 22 is further modulated in accordance with the image density of transparency 12 along a predetermined path, in this case a circle. Detector 22 produces an encoded electrical signal representative of the intensity of the light it receives from source 21. This encoded signal, which is the signal from source 20 modulated by the image density on transparency 12 along the circular path, is coupled by an amplifier 23 to a transmitter 24.

Transmitter 24 radiates to receiver terminal 11 a radio wave that carries the encoded signal. If this radio wave is intercepted at an unauthorized receiver terminal that does not have access to the given image on transparencies 12 and 14, the information cannot be decoded. At receiver terminal 11, however, the radio wave is intercepted by a receiver 25. After appropriate mixing steps, the signal from receiver 25, which is the same encoded signal at the output of light detector 22, is coupled by an amplifier 26 to a light source 27 with a controllable intensity. The intensity of the light from source 27 is modulated in accordance with the amplitude of the signal from receiver 25. Light source 27 is disposed on one side of transparency 14, and a light detector 28 is disposed on the other side of transparency 14 in alignment with source 27. As transparency 14 rotates, the light transmission of the portion of the image between source 27 and detector 28 varies. In addition to rotating at the same frequency, transparencies 12 and 14 are also in phase in that source 21 and detector 22 are positioned at the same point relative to the image on transparency 12 that source 27 and detector 28 are positioned relative to the image on transparency 14. To the extent that transmission delays must be taken into account, transparency 14 would lag transparency 12 slightly in phase. The intensity of the light reaching detector 28 is modulated in accordance with the image density of transparency 14 along the predetermined path, which is the reciprocal of the image transmission of transparency 12. Light detector 28 produces a decoded electrical signal representative of the intensity of the light intercepted from source 27. This decoded signal, which is the analog signal from source 20, is coupled to a load circuit 29, such as a loud speaker.

Figures 2, 3:
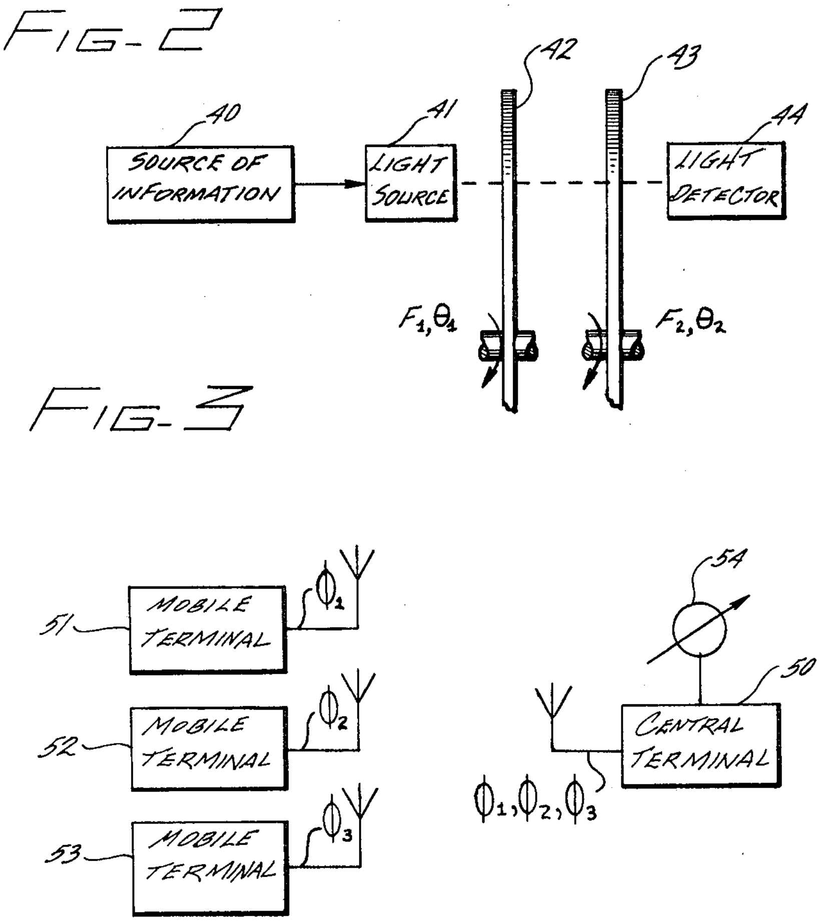
FIG. 2 is a schematic diagram of an alternative arrangement for one of the terminals of FIG. 1.
FIG. 3 is a schematic diagram of a secret signaling system incorporating a feature of the invention.

In FIG. 2, an alternative transmitter or receiver terminal is depicted. A source 40 of information is coupled to a light source 41. A photo transparency 42 bearing one image, and a photo transparency 43 bearing a different image, are arranged serially, i.e., side by side. Source 41 is disposed on one side of transparency 42, and a light detector 44 is disposed on the other side of transparency 43 in alignment with source 41. Transparency 42 is rotated at a frequency $F_1$ and a phase $\theta_1$, and transparency 43 is rotated at a frequency $F_2$ and a phase $\theta_2$. Frequencies $F_1$ and $F_2$ could be different and/or phases $\theta_1$ and $\theta_2$ could be different. The output of detector 44 is modulated in accordance with the images on both of transparencies 42 and 43 and is accordingly even more unintelligible than the corresponding signal in the embodiment of FIG. 1. In the case of a transmitter terminal, source 40 would correspond to source 20, source 41 would correspond to source 21, and detector 44 would correspond to detector 22. In the case of a receiver terminal, source 40 would correspond to amplifier 26, source 41 would correspond to source 27, and detector 44 would correspond to detector 28. As in the embodiment of FIG. 1, the other terminal would have two photo transparencies that are the opposite representation of the images on transparencies 42 and 43, respectively, and that rotate in synchronism with transparencies 42 and 43, respectively.

FIG. 3 illustrates an embodiment in which a central command terminal 50 can communicate selectively with any one of a number of remote mobile terminals 51, 52, and 53. For the purposes of discussion, it is assumed that terminal 50 is identical to transmitter terminal 10 in FIG. 1, and terminals 51, 52, and 53 are each identical to receiver terminal 11 in FIG. 1. However, terminals 50 through 53 could also be two-way terminals. Each of terminals 51 through 53 has a circular disc-shaped positive photo transparency of a given image. The transparencies of terminals 51, 52, and 53 rotate at the same frequency but are in different phases relative to their respective light source and detector, as represented by $\phi_1$, $\phi_2$, and $\phi_3$. By way of example $\phi_1$, $\phi_2$, and $\phi_3$ could be 0°, 120°, and 240°, respectively. Terminal 50 has a circular disc-shaped negative photo transparency of the given image. The transparency of terminal 50 rotates at the same frequency as the transparencies of terminals 51, 52, and 53. An adjustment 54 is provided to change the phase of the transparency of terminal 50 relative to its light source and detector to $\phi_1$, $\phi_2$, or $\phi_3$, thereby permitting communication with any one of terminals 51 through 53 to the exclusion of the others. The adjustment at terminal 50 could be effected in a number of ways. For example, the light source and detector could be mounted so as to move as a unit to one of three different locations about the transparency. If $\phi_1$, $\phi_2$, and $\phi_3$ are 120° apart, these locations would also be spaced 120° apart.

Figure 4:
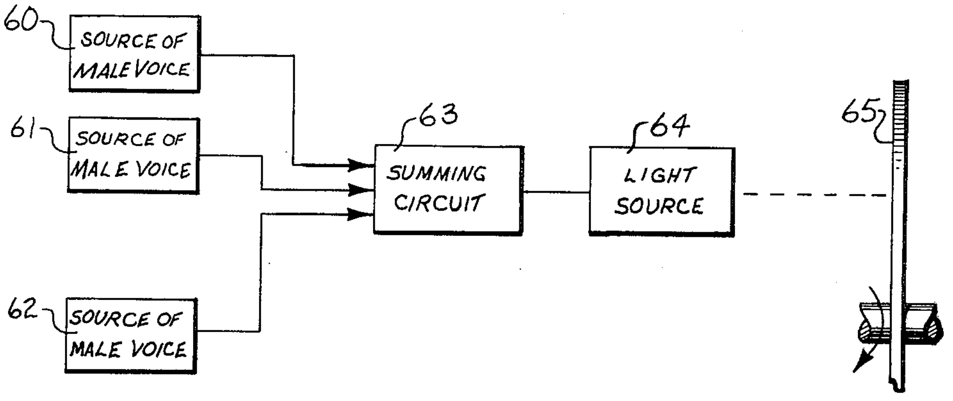
FIG. 4 is a schematic diagram of a set-up for producing a particularly advantageous image for use with the invention in a voice scrambler system.

A particularly effective image for use in connection with the invention is an image representing the sum of a plurality of sources of the same type of information as the analog signal. This produces a complex modulating factor having a frequency spectrum corresponding to that of the analog signal. FIG. 4 discloses a set-up for producing such an image assuming that the type of information is a male voice. Sources 60, 61, and 62 of male voice are coupled to a summing circuit 63, so that various voices from sources 60 through 62 are additively combined with each other. Summing circuit 63 is coupled to a light source 64 to modulate its intensity. Light source 64 is directed at an unexposed photographic emulsion on a circular disc 65 which is made to follow a perdetermined path to be taken later when the analog signal is to be modulated, in this case a circular path. The speed of disc 65 is also the same as the speed to be taken later when the analog signal is to be modulated. After disc 65 has completed its predetermined path, the emulsion is developed to produce positive and negative photo transparencies which are employed in the manner described in connection with FIG. 1.

Figure 5:
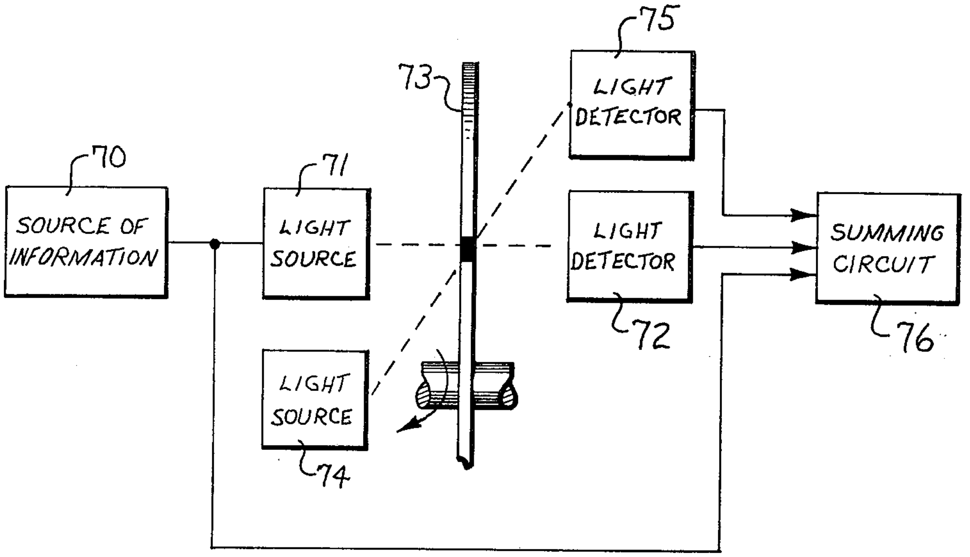
FIG. 5 is a schematic diagram of a modification of one of the terminals of FIG. 1.

During modulation and demodulation at transmitter terminal 10 and receiver terminal 11, respectively, the following components are generated: the information signal per se, e.g., the analog signal; the modulating or coding signal per se, e.g., the signal representative of the image density of the transparency; and the product of the information signal and the coding signal. The presence of the information signal per se and the coding signal per se decreases the signal-to-noise ratio of the system and makes it easier for unauthorized persons to decipher the information. It is, therefore, desirable to remove these components so only the product remains. In some cases, the unwanted components can be removed by selective filtering because of the separation of the different frequency bands. Where selective filtering is not practical, the arrangement of FIG. 5 could be employed. A source of information 70 is coupled to the light source 71 to modulate its intensity. Light source 71 and a light detector 72 are aligned with each other on opposite sides of a rotating disc-shaped photo transparency 73. A light source 74, which has a constant intensity equal to the nominal intensity of light source 71, is directed to pass through transparency 73 at the same point as the light from source 71. A light detector 75, which is disposed in alignment with light source 74 on the opposite side of transparency 73, produces a signal identical to the unwanted coding signal component produced by light detector 72. Light detector 72, light detector 75, and source 70 are connected to a summing circuit 76 to remove by subtraction the unwanted coding component signal and the unwanted information component signal from the composite signal produced at detector 72. Consequently, only the product of the information signal and the coding signal remains. In the case of transmitter terminal 10, source 70 corresponds to source 20, source 71 corresponds to light source 21, transparency 73 corresponds to transparency 12, and detector 72 corresponds to detector 22, and the output of summing circuit 76 is connected to amplifier 23. In the case of receiver terminal 11, source 70 corresponds to amplifier 26, source 71 corresponds to source 27, transparency 73 corresponds to transparency 14, detector 72 corresponds to detector 28, and the output of summing circuit 76 is connected to load circuit 29. Although some improvement in the signal-to-noise ratio results if only one of the terminals is provided with this arrangement, maximum improvement is obtained by providing both terminals with this arrangement.

The described embodiments of the invention are only considered to be preferred and illustrative of the inventive concepts; the scope of the invention is not to be restricted to such embodiments. Various and numerous other arrangements may be devised by one skilled in the art without departing from the spirit and scope of this invention. For example, the particular path taken along the photo transparency could be spiral or rectilinear rather than circular. Further, a photo print rather than a photo transparency could be employed, in which case the coding image density would be represented by the reflectivity rather than the transmission of the photo. (The term "image density" is used herein to refer to photographic density of the image, which is related to the light transmission through a photo transparency or the light reflected from a photo print.) Moreover, in some cases it may be desirable to employ photographic identities rather than opposites at the transmitter and receiver; the light source at the receiver is not then modulated by the encoded signal but produces a constant intensity which causes the output of the light detector to be the encoding signal. This is combined with the encoded signal in an analog amplitude dividing circuit to produce the information signal.

What is claimed is:

1. A secret signaling system comprising:

a source of an information signal to be transmitted;

a photo positive of a given image;

a photo negative of the given image;

means for modulating the information signal from the source in accordance with the image density of one of the photos along a predetermined path;

means for transmitting the modulated information signal to a point remote from the source; and means for demodulating the modulated signal at the remote point in accordance with the image density of the other photo along the predetermined path to produce the information signal.

2. The system of claim 1, in which the photos are transparencies, the image density of each photo determines the light transmission thereof, the modulating means modulates in accordance with the transmission of the one photo, and the demodulating means demodulates in accordance with the transmission of the other photo.

3. The system of claim 2, in which the modulating means comprises a light source having a controllable intensity; a light detector aligned with the light source; means for coupling the source of an information signal to the light source to modulate the intensity of the light source; means for supporting the one photo in the path from the light source to the light detector; and means for introducing relative motion between the one photo and the light source and aligned light detector to define the predetermined path along the one photo.

4. The system of claim 3, in which the demodulating means comprises a remote light source having a controllable intensity; a remote light detector aligned with the remote light source; means for coupling the modulated signal to the remote light source to modulate the intensity of the remote light source; means for supporting the other photo in the path from the remote light source to the remote light detector; and means for introducing relative motion between the other photo and the remote light source and aligned remote light detector to define the predetermined path along the other photo.

5. The system of claim 2, in which the demodulating means comprises a light source having a controllable intensity; a light detector aligned with the light source; means for coupling the modulated signal to the light source to modulate the intensity of the light source; means for supporting the other photo in the path, from the light source to the light detector; and means for introducing relative motion between the other photo and the light source and aligned light detector to define the predetermined path along the other photo transparency.

6. The system of claim 1, additionally comprising a further photo positive of a further given image and a further photo negative of the further given image, the modulating means additionally modulating the information signal from the source in accordance with the image density along a further particular path of one of the further photos and the demodulating means additionally demodulating the modulated signal in accordance with the image density along the further particular path of the other further photo.

7. The system of claim 1, in which the given image represents the sum of a plurality of sources of the same type of information as the information of the source of an information signal.

8. The system of claim 7, in which the type of information is a human voice.

9. The system of claim 1, in which the photos comprise first and second rotatable discs; the modulating means comprises first stationary means for detecting the image density on the first disc and means for rotating the first disc past the first detecting means so the predetermined path along the one photo is a circle defined by the locus of points of the first disc adjacent to the first detecting means; and the demodulating means comprises second stationary means for detecting the image density on the second disc and means for rotating the second disc past the second detecting means at the same frequency as and in phase with the rotation of the first disc relative to their respective detecting means so the predetermined path along the other photo is a circle defined by the locus of points of the second disc adjacent to the second detecting means.

10. The system of claim 9, additionally comprising a third rotatable disc bearing the other photo at a further remote point; and further means for demodulating the modulated signal at the further remote point in accordance with the image density of the other photo along the predetermined path to produce the information signal, the further demodulating means comprising third stationary means for detecting the image density along the third disc and means for rotating the third disc past the third detecting means at the same frequency as and in different phase from the rotation of the second disc relative to their respective detecting means so the predetermined path along the other photo on the third disc is a circle defined by the locus of points of the third disc adjacent to the third detecting means; and the modulating means being adjustable to bring the first disc into phase with the third disc relative to their respective detecting means.

11. A secret signaling system comprising:

a source of an information signal to be transmitted;

means for modulating the information signal from the source in accordance with a modulating factor representative of the sum of a plurality of sources of the same type of information as the information of the source;

means for transmitting the modulated information signal to a point remote from the source; and means for demodulating the modulated signal at the remote point in accordance with the reciprocal of the modulating factor to produce the information signal.

12. The system of claim 11, in which the modulating means produces a first component signal representative of the information signal, a second component signal representative of the modulating factor, and a third component signal representative of the product of the information signal and the modulating factor, the system additionally comprising a source of modulating signal representative of the modulating factor, an algebraic summing circuit, and means for coupling the source of an information signal, the source of a modulating signal, and the modulating means to the summing circuit to eliminate the first and second component signals produced by the modulating means.

13. The system of claim 12, in which the modulating means comprises a photo transparency, a source of light modulated in intensity by the information signal disposed on one side of the photo transparency, a light detector disposed in alignment with the light source on the other side of the photo transparency, and means for moving the photo transparency relative to the source of light and the light detector to produce at the light detector the first, second, and third component signals; and the source of a modulating signal comprises a source of light of constant intensity disposed on the one side of the photo transparency and directed to the same point on the photo transparency as the light from the modulated source of light, and a light detector disposed in alignment with the source of light of constant intensity on the other side of the photo transparency.

14. A secret signaling system comprising:

a source of an information signal to be transmitted;

a rotating encoding disc having a modulating factor that varies as the disc rotates;

means for modulating the information signal from the source in accordance with the modulating factor of the encoding disc as the encoding disc rotates;

means for transmitting the modulated information signal to a first point remote from the source;

a first decoding disc at the first remote point, the first decoding disc representing the reciprocal of the modulating factor of the encoding disc and rotating at the same frequency as and in phase with the encoding disc;

means for demodulating the modulated signal at the first remote point in accordance with the modulating factor of the first decoding disc to produce the information signal;

means for transmitting the modulated information signal to a second point remote from the source;

a second decoding disc located at the second remote point, the second decoding disc representing the recirpocal of the modulating factor of the encoding disc and rotating at the same frequency as and a different phase from the encoding disc;

the modulating means being adjustable to bring the encoding disc into phase with the second encoding disc; and means for demodulating the modulated signal at the second remote point in accordance with the modulating factors of the second decoding disc when the encoding disc is in phase therewith to produce the information signal.

* * * * *